US011411291B2

(12) United States Patent
Wu

(10) Patent No.: US 11,411,291 B2
(45) Date of Patent: Aug. 9, 2022

(54) ANTENNA DEVICE, FEEDING CABLE MODULE THEREOF, AND METALLIC CABLE HOLDER

(71) Applicant: WISTRON NEWEB CORPORATION, Hsinchu (TW)

(72) Inventor: Yu-Shuo Wu, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 121 days.

(21) Appl. No.: 17/004,076

(22) Filed: Aug. 27, 2020

(65) Prior Publication Data

US 2021/0184325 A1 Jun. 17, 2021

(30) Foreign Application Priority Data

Dec. 12, 2019 (TW) ................................ 108145449

(51) Int. Cl.
*H01Q 1/50* (2006.01)
*H01Q 1/12* (2006.01)
*H02G 3/32* (2006.01)
*H01P 3/08* (2006.01)

(52) U.S. Cl.
CPC ................ *H01P 3/08* (2013.01); *H01Q 1/12* (2013.01); *H01Q 1/50* (2013.01); *H02G 3/32* (2013.01)

(58) Field of Classification Search
CPC .... H01Q 1/2283; H01Q 1/50; H01R 2201/02; H01R 9/03; H01R 9/05; H01R 9/0515; H01R 9/2466; H01R 2/50; H01R 2/51; H05K 3/42; H02G 3/32
See application file for complete search history.

(56) References Cited

U.S. PATENT DOCUMENTS

| 9,444,159 B2 * | 9/2016 | Lappoehn | ............ H01R 12/675 |
| 2005/0068250 A1 * | 3/2005 | Cornec | ..................... H02G 3/32 |
| | | | 343/702 |
| 2010/0283710 A1 * | 11/2010 | Lutman | .................... H01Q 1/48 |
| | | | 343/906 |

(Continued)

FOREIGN PATENT DOCUMENTS

| CN | 2522890 Y | 11/2002 |
| CN | 201430301 Y | 3/2010 |

(Continued)

*Primary Examiner* — Jason Crawford
(74) *Attorney, Agent, or Firm* — McClure, Qualey & Rodack, LLP

(57) ABSTRACT

An antenna device, a feeding cable module thereof, and a metallic cable holder are provided. The metallic cable holder includes two fixing portions and a cable arrangement portion. The two fixing portions are arranged along a straight direction and are fixed onto a metal plate. The cable arrangement portion is connected between the two fixing portions and includes a plurality of rack segments regularly arranged along the straight direction. Each of the rack segments has an insertion opening, and the insertion opening of each of the rack segments is configured to hold a feeding cable having a cable diameter that is greater than an opening diameter of the insertion opening. When the feeding cable passes through the insertion opening to be positioned by the corresponding rack segment, the feeding cable is surrounded by the corresponding rack segment with a predetermined angle that is smaller than 360 degrees.

19 Claims, 14 Drawing Sheets

(56) References Cited

U.S. PATENT DOCUMENTS

| | | | | |
|---|---|---|---|---|
| 2014/0153211 | A1* | 6/2014 | Malek | H01Q 1/38 |
| | | | | 264/447 |
| 2018/0138604 | A1* | 5/2018 | Otsu | H01R 4/185 |
| 2019/0044258 | A1* | 2/2019 | Everest | H05K 1/14 |
| 2021/0184325 | A1* | 6/2021 | Wu | H01Q 1/12 |

FOREIGN PATENT DOCUMENTS

| | | |
|---|---|---|
| CN | 202495566 U | 10/2012 |
| CN | 203774565 U | 8/2014 |
| CN | 108322399 A | 7/2018 |
| CN | 207995301 U | 10/2018 |
| TW | M533395 U | 12/2016 |

\* cited by examiner

ANTENNA DEVICE, FEEDING CABLE MODULE THEREOF, AND METALLIC CABLE HOLDER

CROSS-REFERENCE TO RELATED PATENT APPLICATION

This application claims the benefit of priority to Taiwan Patent Application No. 108145449, filed on Dec. 12, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an electronic device, and more particularly to an antenna device, a feeding cable module thereof, and a metallic cable holder.

BACKGROUND OF THE DISCLOSURE

A conventional antenna device can transmit a signal to a radiation antenna through a feeding cable. Since the inner space of the conventional antenna device is limited, the feeding cable needs to be arranged and positioned along a specific path. Specifically, the conventional antenna device is manually assembled with a plurality of plastic buckles, and the plastic buckles are used to fix the feeding cable in position. However, the plastic buckles of the conventional antenna device are only used for fixing in position a feeding cable of a specific size.

SUMMARY OF THE DISCLOSURE

In response to the above-referenced technical inadequacies, the present disclosure provides an antenna device, a feeding cable module thereof, and a metallic cable holder to effectively improve on the issues associated with conventional antenna devices.

In one aspect, the present disclosure provides an antenna device, which includes a metal plate, a radiation antenna, a feeding cable, and a plurality of metallic cable holders. The metal plate has a first surface and a second surface that is opposite to the first surface. The radiation antenna is disposed on the first surface of the metal plate. The feeding cable is arranged at a side of the metal plate away from the radiation antenna and is connected to the radiation antenna by passing through the metal plate. Each of the metallic cable holders is formed by winding one metal wire, and includes two fixing portions and a cable arrangement portion. In each of the metallic cable holders, the two fixing portions is arranged along a straight direction and is fixed to the second surface of the metal plate, and the cable arrangement portion is connected between the two fixing portions and includes a plurality of rack segments regularly arranged along the straight direction. Each of the rack segments has an insertion opening arranged away from the metal plate, and an opening diameter of the insertion opening of each of the rack segments is smaller than a cable diameter of the feeding cable. When the feeding cable passes through the insertion opening of at least one of the rack segments, the feeding cable is fixed in position by the at least one of the rack segments and is surrounded by the at least one of the rack segments with a predetermined angle that is smaller than 360 degrees.

In one aspect, the present disclosure provides a feeding cable module of an antenna device, which includes a feeding cable and a metallic cable holder. The metallic cable holder is integrally formed as a one-piece structure and includes two fixing portions and a cable arrangement portion. The two fixing portions are arranged along a straight direction and are configured to be fixed onto a metal plate. The cable arrangement portion is connected between the two fixing portions and includes a plurality of rack segments regularly arranged along the straight direction. Each of the rack segments has an insertion opening, and an opening diameter of the insertion opening of each of the rack segments is smaller than a cable diameter of the feeding cable. When the feeding cable passes through the insertion opening of at least one of the rack segments, the feeding cable is fixed in position by the corresponding rack segment and is surrounded by the corresponding rack segment with a predetermined angle that is smaller than 360 degrees.

In one aspect, the present disclosure provides a metallic cable holder of an antenna device, which includes two fixing portions and a cable arrangement portion. The two fixing portions are arranged along a straight direction and are configured to be fixed onto a metal plate. The cable arrangement portion is connected between the two fixing portions and includes a plurality of rack segments regularly arranged along the straight direction. Each of the rack segments has an insertion opening, and the insertion opening of each of the rack segments is configured to hold a feeding cable having a cable diameter that is greater than an opening diameter of the insertion opening.

Therefore, a cable diameter of the feeding cable positioned by the rack segment of the present disclosure can be designed within a predetermined range (i.e., the cable diameter is not a specific value) by the metal structure of the rack segment, so that the rack segment can be used to satisfy more different design requirements of the feeding cable. Specifically, the opening diameter of the insertion opening of the rack segment is smaller than the cable diameter of the feeding cable, thereby preventing the feeding cable positioned by the corresponding rack segment from being detached from the corresponding insertion opening.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
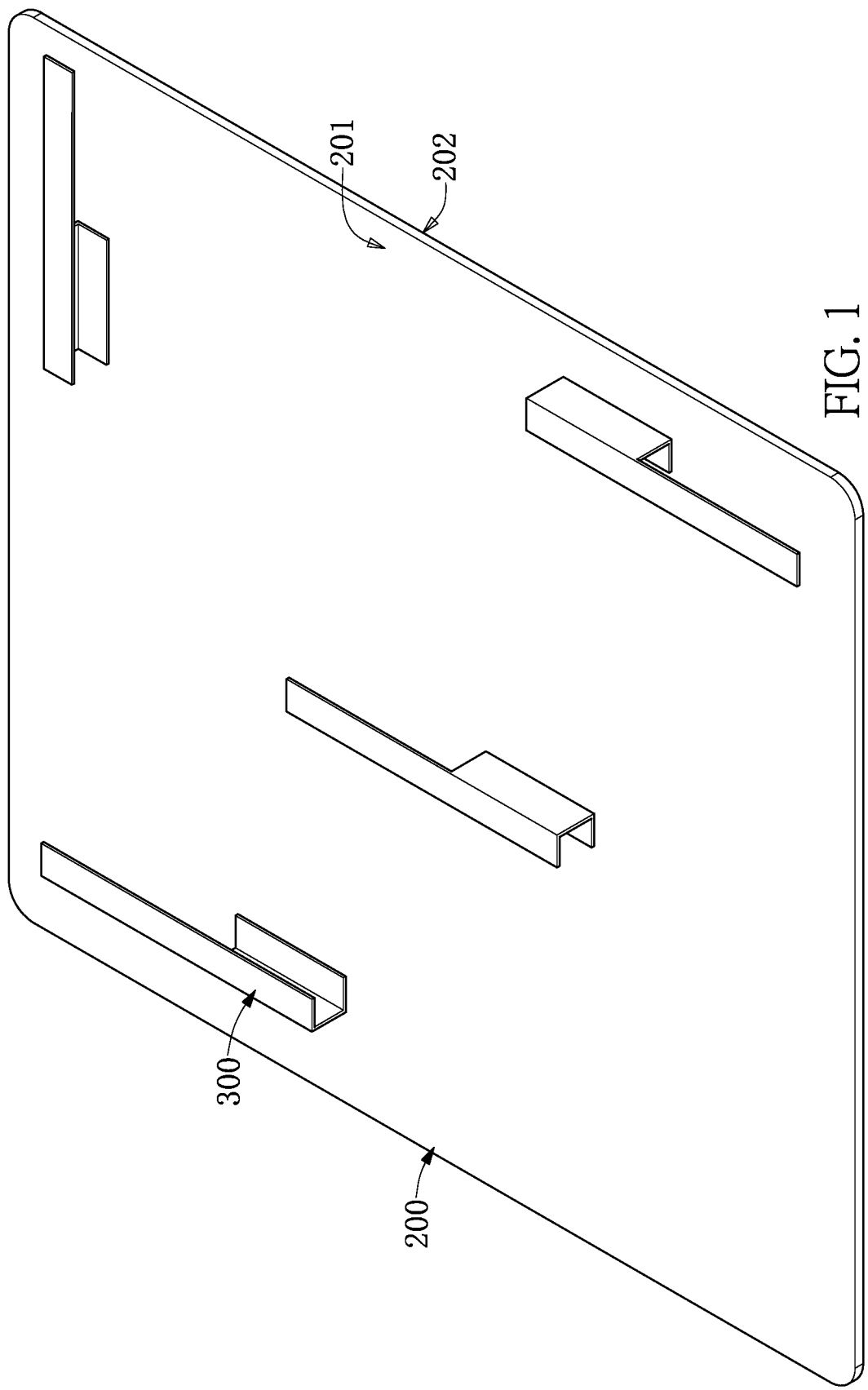
FIG. 1 is a perspective view of an antenna device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 2:
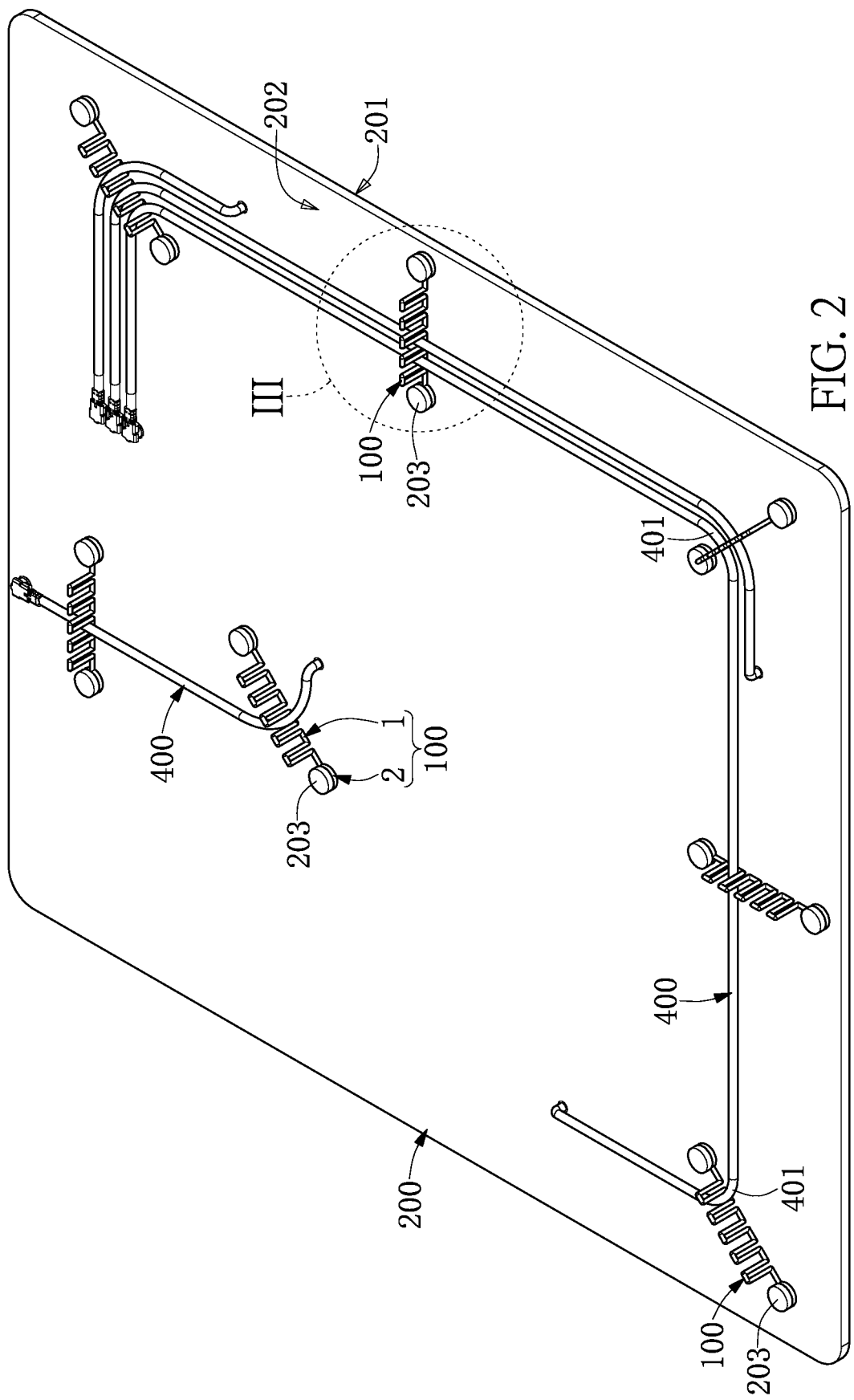
FIG. 2 is a perspective view of FIG. 1 from another angle of view.

Referring to FIG. 1 to FIG. 6, a first embodiment of the present disclosure provides an antenna device. As shown in FIG. 1 and FIG. 2, the antenna device includes a metal plate 200, a plurality of radiation antennas 300 disposed on the metal plate 200, a plurality of feeding cables 400 respectively connected to the radiation antennas 300, and a plurality of metallic cable holders 100 that are fixed onto the metal plate 200. It should be noted that the issues improved by the present disclosure, the technical features provided by the present disclosure, and the effects achieved by the present disclosure are associated with an antenna field.

Moreover, the antenna device in the present embodiment is provided with the above components, but the present disclosure is not limited thereto. For example, the quantity of the radiation antennas 300 or the quantity of the feeding cables 400 can be at least one; or, the metallic cable holder 100 (and the feeding cable 400) can be independently applied (e.g., sold) or can be used in cooperation with other components. The following description describes the structure and connection relationship of each component of the antenna device of the present embodiment.

The metal plate 200 includes a first surface 201 and a second surface 202 that is opposite to the first surface 201. The radiation antennas 300 are disposed on the first surface 201 of the metal plate 200. The feeding cables 400 are arranged at a side of the metal plate 200 away from the radiation antennas 300, and are respectively connected to the radiation antennas 300 by passing through the metal plate 200. In other words, a portion of each of the feeding cables 400 passing through the metal plate 200 is disposed on or arranged adjacent to the second surface 202 of the metal plate 200.

As the radiation antennas 300 and the feeding cables 400 are of a similar structure, the following description discloses the structure of just one of the radiation antennas 300 and the feeding cable 400 connected thereto for the sake of brevity.

Specifically, the feeding cable 400 can be arranged along a peripheral region of the metal plate 200. The feeding cable 400 can have a plurality of bending segments 401, and a portion of each of the bending segments 401 is fixed in position by one of the metallic cable holders 100. In other words, the feeding cable 400 can be located at a predetermined position by being used in cooperation with the metallic cable holders 100.

Figure 3:
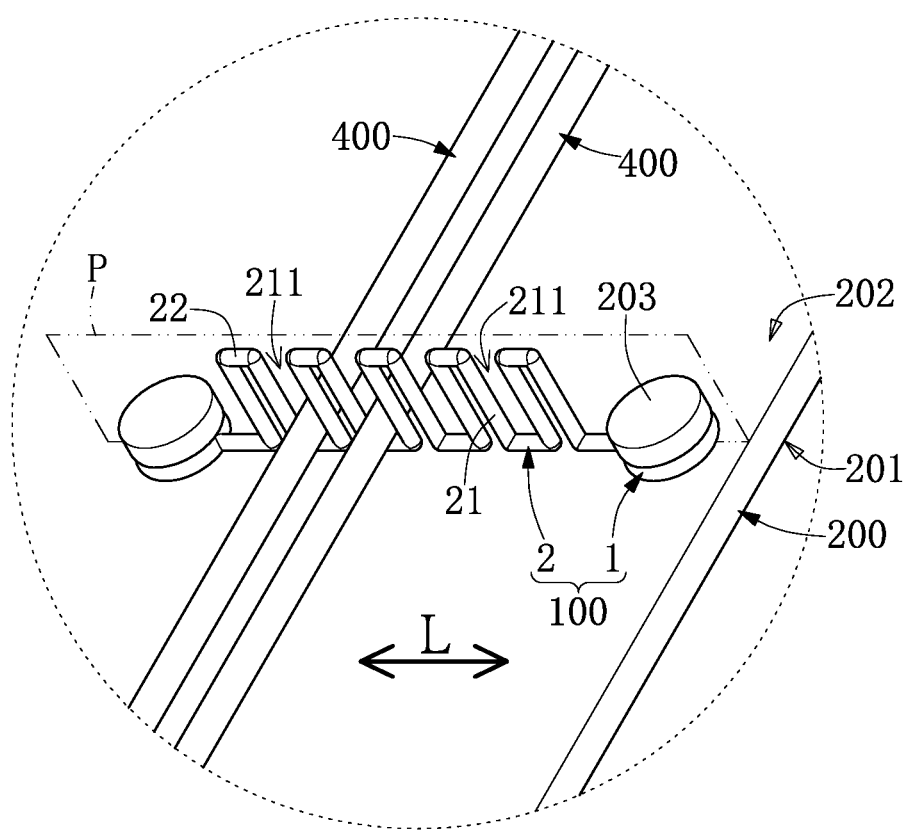
FIG. 3 is an enlarged view of portion III of FIG. 2.

As shown in FIG. 2 and FIG. 3, each of the metallic cable holders 100 in the present embodiment is integrally formed as a one-piece structure (e.g., the metallic cable holder 100 can be formed by winding one metal wire). Each of the metallic cable holders 100 is an elastic structure, and includes two fixing portions 1 and a cable arrangement portion 2 that is connected between the two fixing portions 1. In each of the metallic cable holders 100 of the present embodiment, the two fixing portions 1 are arranged along a straight direction L and are fixed to the second surface 202 of the metal plate 200, but the fixing manner between the metallic cable holder 100 and the metal plate 200 can be adjusted or changed according to design requirements.

Figure 4:
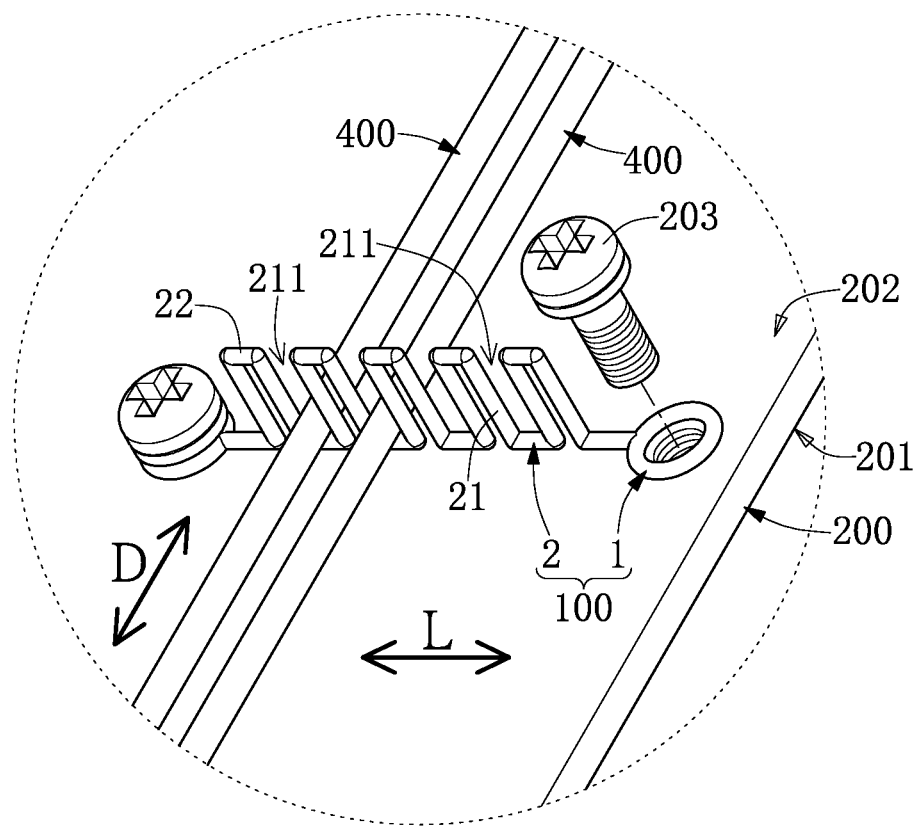
FIG. 4 is a partial perspective view showing another configuration of FIG. 3.

For example, as shown in FIG. 3, the metal plate 200 includes a plurality of pillar structures 203, each of the fixing portions 1 is a ring-shaped structure, the two fixing portions 1 of each of the metallic cable holders 100 are respectively positioned by two of the pillar structures 203 so as to be fixed to the metal plate 200. Specifically, as shown in FIG. 3, the pillar structures 203 can be rivets, so that the two fixing portions 1 of the metallic cable holder 100 can be riveted onto the metal plate 200 by two of the rivets. In addition, as shown in FIG. 4, the pillar structures 203 can be screws, so that the two fixing portions 1 of the metallic cable holder 100 can be screwed to the metal plate 200 by two of the screws.

Figure 5:
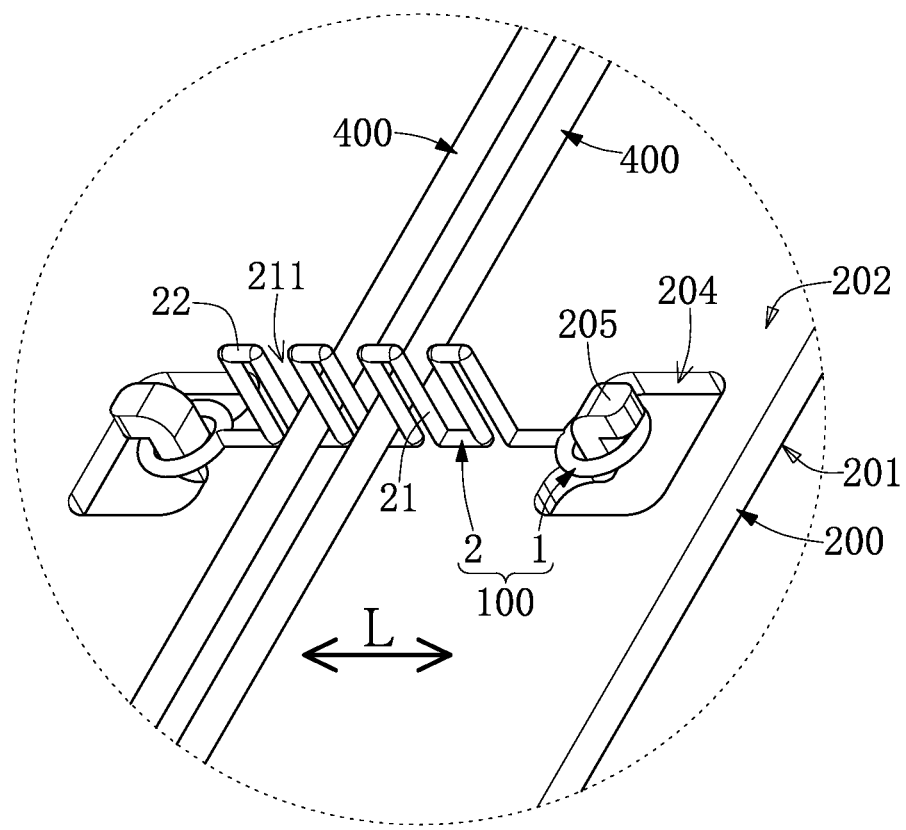
FIG. 5 is a partial perspective view showing still another configuration of FIG. 3.

Moreover, as shown in FIG. 5, the metal plate 200 has a plurality of notches 204 and a plurality of hooks 205. The hooks 205 respectively extend from inner walls of the notches 204 away from the first surface 201, and any two of the hooks 205 adjacent to each other curvedly extend along different directions away from each other. Each of the fixing portions 1 is a ring-shaped structure, and the two fixing portions 1 of each of the metallic cable holders 100 are respectively sleeved around two of the hooks 205 adjacent to each other so as to be fixed to the metal plate 200.

The connection relationship between the metallic cable holder 100 and the metal plate 200 of the present embodiment is described in the above description, and the following description describes the detail structure of the metallic cable holder 100 and the connection relationship between the metallic cable holder 100 and the feeding cable 400, but the present disclosure is not limited thereto.

As the metallic cable holders 100 in the present embodiment are of the same structure, the following description discloses the structure of just one of the metallic cable holders 100 for the sake of brevity, but the present disclosure is not limited thereto. For example, in other embodiments of the present embodiments, the metallic cable holders 100 in the antenna device can be of different structure.

Figure 6:
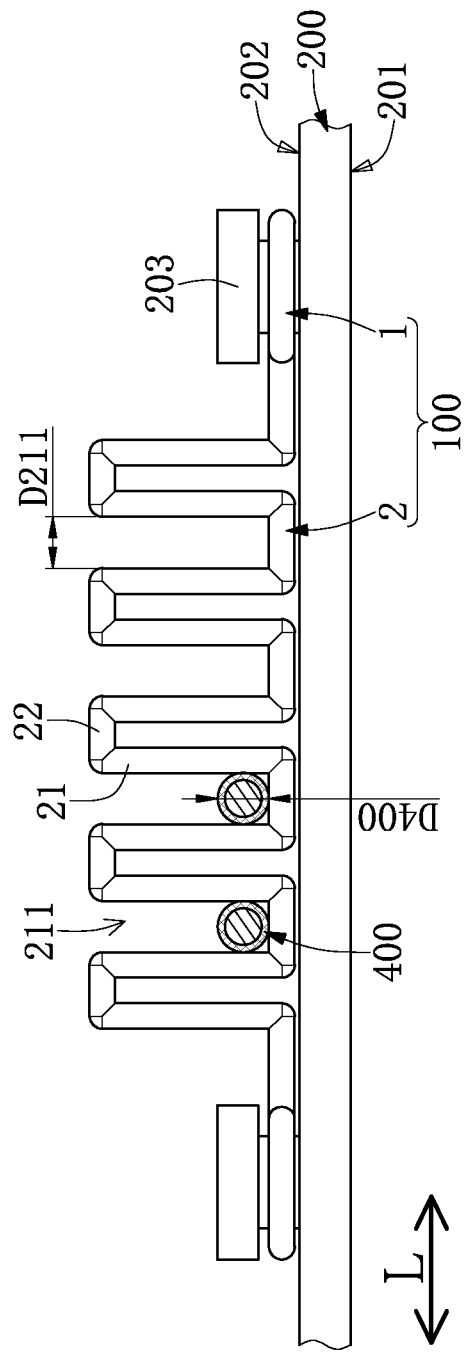
FIG. 6 is a cross-sectional view of FIG. 3.

In the present embodiment, as shown in FIG. 3 and FIG. 6, the cable arrangement portion 2 includes a plurality of rack segments 21 and a plurality of buffering segments 22. The rack segments 21 and the buffering segments 22 are regularly (e.g., staggeredly) arranged along the straight direction L, and any two of the rack segments 21 adjacent to each other are connected to one of the buffering segments 22, but the present disclosure is not limited thereto. For example, in other embodiments of the present embodiments, the cable arrangement portion 2 can be formed without the buffering segments 22.

Moreover, each of the rack segments 21 has an insertion opening 211 arranged away from the metal plate 200. The feeding cable 400 can pass through the insertion opening 211 of at least one of the rack segments 21, so that the feeding cable 400 is fixed in position by the at least one of the rack segments 21 and is surrounded by the at least one of the rack segments 21 with a predetermined angle that is smaller than 360 degrees. In other words, when the rack segment 21 and a portion of the feeding cable 400 surrounded thereby are orthogonally projected onto a plane along a longitudinal direction D of the feeding cable 400 (as shown in FIG. 4), a projection region defined by the rack segment 21 cannot entirely surround a projection region defined by the portion of the feeding cable 400.

Specifically, an opening diameter D211 of the insertion opening 211 is smaller than a cable diameter D400 of the feeding cable 400, thereby preventing the feeding cable 400 positioned by the corresponding rack segment 21 from being detached from the corresponding insertion opening 211. Moreover, the opening diameter D211 of the insertion opening 211 can be greater than 35% of the cable diameter D400, thereby preventing the feeding cable 400 from being damaged when passing through the insertion opening 211. In other words, the cable diameter D400 of the feeding cable 400 positioned by the rack segment 21 can be designed within a predetermined range (i.e., the cable diameter D400 is not a specific value), so that the rack segment 21 can be used to satisfy more different design requirements of the feeding cable 400.

The following description describes the structure of the cable arrangement portion 2, but the structure of the cable arrangement portion 2 can be adjusted or changed according to design requirements (e.g., the following second to fourth embodiments). The cable arrangement portion 2 curvedly extends from one of the two fixing portions 1 to the other one of the two fixing portions 1 along a distribution plane P. In the present embodiment, a part of the cable arrangement portion 2 adjacent to the metal plate 200 and the two fixing portions 1 are substantially disposed on the same surface (e.g., the second surface 202).

Specifically, the distribution plane P in the present embodiment is orthogonal to the second surface 202 of the metal plate 200, thereby conveniently placing the feeding cable 400 into the rack segment 21 of the cable arrangement portion 2, but the present disclosure is not limited thereto. For example, in other embodiments of the present embodiments, the distribution plane P and the second surface 202 of the metal plate 200 form an angle there-between that can be within a range of 10-90 degrees, 30-90 degrees, or 45-90 degrees.

Moreover, each of the rack segments 21 has a U shape that includes three parts each parallel or perpendicular to the straight direction L. Two ends of the U shape of the rack segment 21 define the insertion opening 211, and each of the two ends of the U shape is connected to one of the buffering segments 22. Any two of the rack segments 21 adjacent to each other have a distance there-between (i.e., a length of any one of the buffering segment 22) that is smaller than the opening diameter D211 of any one of the rack segments 21.

Accordingly, when the feeding cable 400 is inserted into the rack segment 21 by passing through or spreading out the insertion opening 211, the rack segment 21 is elastically deformed to firmly clutch the feeding cable 400, and the distance between any two of the rack segments 21 adjacent to each other (or the length of the buffering segment 22) can provide space for the rack segment 21 or the insertion opening 211 to be deformed.

Moreover, a depth of the rack segment 21 defined by counting from the insertion opening 211 can be greater than the cable diameter D400 of the feeding cable 400 and is smaller than 2.5 times of the cable diameter D400 of the feeding cable 400, thereby effectively positioning with the feeding cable 400 therein.

Second Embodiment

Figure 7:
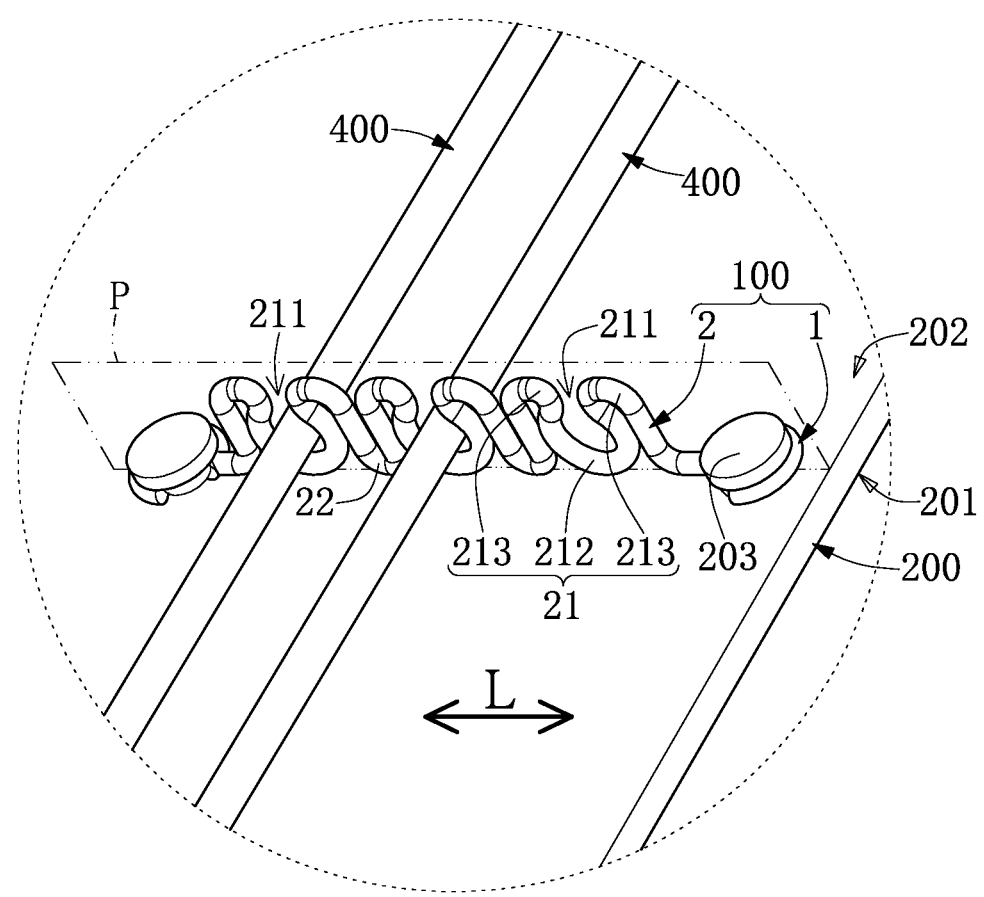
FIG. 7 is a partial perspective view of an antenna device according to a second embodiment of the present disclosure.
Figure 8:
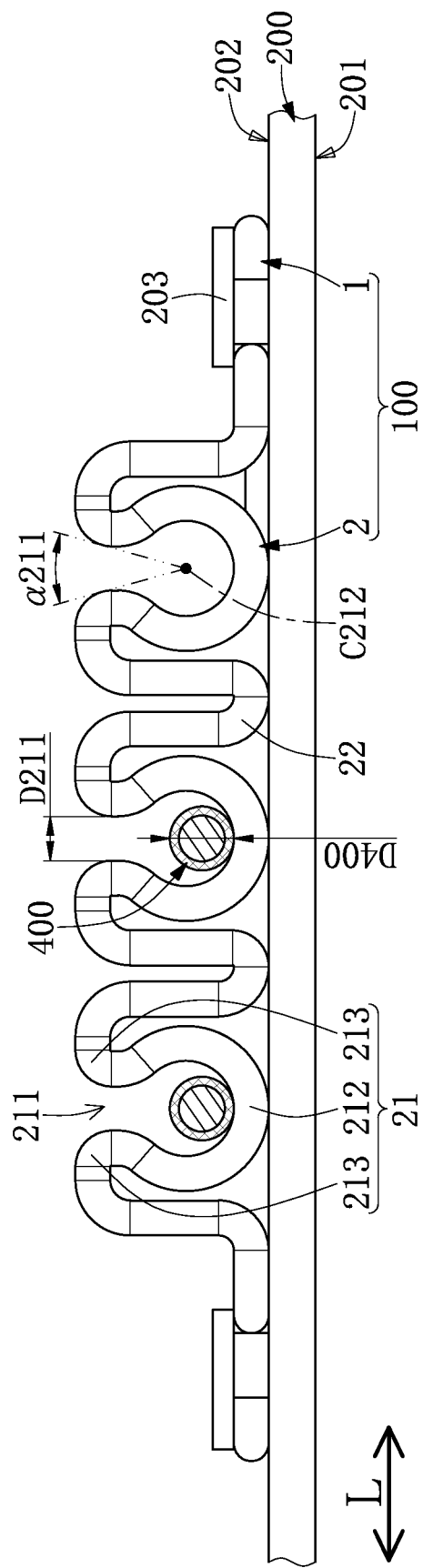
FIG. 8 is a cross-sectional view of FIG. 7.

Referring to FIG. 7 and FIG. 8, a second embodiment of the present disclosure is similar to the first embodiment of the present disclosure. For the sake of brevity, descriptions of the same components in the first and second embodiments of the present disclosure (e.g., the metal plate 200, the radiation antenna 300, and the feeding cable 400) will be omitted, and the following description only discloses different features between the first and second embodiments that reside in the structure of the cable arrangement portion 2 of the metallic cable holder 100.

In the present embodiment, the cable arrangement portion 2 curvedly extends from one of the two fixing portions 1 to the other one of the two fixing portions 1 along a distribution plane P, and a part of the cable arrangement portion 2 adjacent to the metal plate 200 and the two fixing portions 1 are substantially disposed on the same surface (e.g., the second surface 202).

Specifically, the distribution plane P in the present embodiment is orthogonal to the second surface 202 of the metal plate 200, thereby conveniently placing the feeding cable 400 into the rack segment 21 of the cable arrangement portion 2, but the present disclosure is not limited thereto. For example, in other embodiments of the present embodiments, the distribution plane P and the second surface 202 of the metal plate 200 can also form an angle there-between that can be within a range of 10-90 degrees, 30-90 degrees, or 45-90 degrees.

Moreover, each of the rack segments 21 has a $\Omega$ shape that includes an arc sub-segment 212 and two end sub-segments 213. The two end sub-segments 213 are respectively connected to two ends of the arc sub-segment 212, and each of the two end sub-segments 213 is connected to one of the buffering segments 22. In each of the rack segments 21, the two ends of the arc sub-segment 212 (or the two end sub-segments 213) jointly define the insertion opening 211 that has a center angle α211 with respect to a center of circle C212 of the arc sub-segment 211. The center angle α 211 in the present embodiment is smaller than 90 degrees, and can be within a range of 30-60 degrees, but the present disclosure is not limited thereto.

Specifically, when the feeding cable 400 is inserted into the rack segment 21 by passing through or spreading out the insertion opening 211, the feeding cable 400 is movable in a space surroundingly defined by the corresponding rack segment 21. In other words, a diameter of the arc sub-segment 212 is greater than the cable diameter D400 of the feeding cable 400, but the present disclosure is not limited thereto. For example, in other embodiments of the present embodiments, the diameter of the arc sub-segment 212 can be substantially equal to the cable diameter D400 of the feeding cable 400, so that the feeding cable 400 passing through the insertion opening 211 can be clutched and positioned by the arc sub-segment 212 of the corresponding rack segment 21.

In addition, any two of the rack segments 21 adjacent to each other are connected to one of the buffering segment 22 having a U shape, so that the U-shaped buffering segment 22 can provide space for the insertion opening 211 to be deformed, but the buffering segment 22 of the present disclosure is not limited to having the U shape. The shape of the buffering segment 22 can be adjusted or changed according to design requirements (e.g., a V shape).

Third Embodiment

Figure 9:
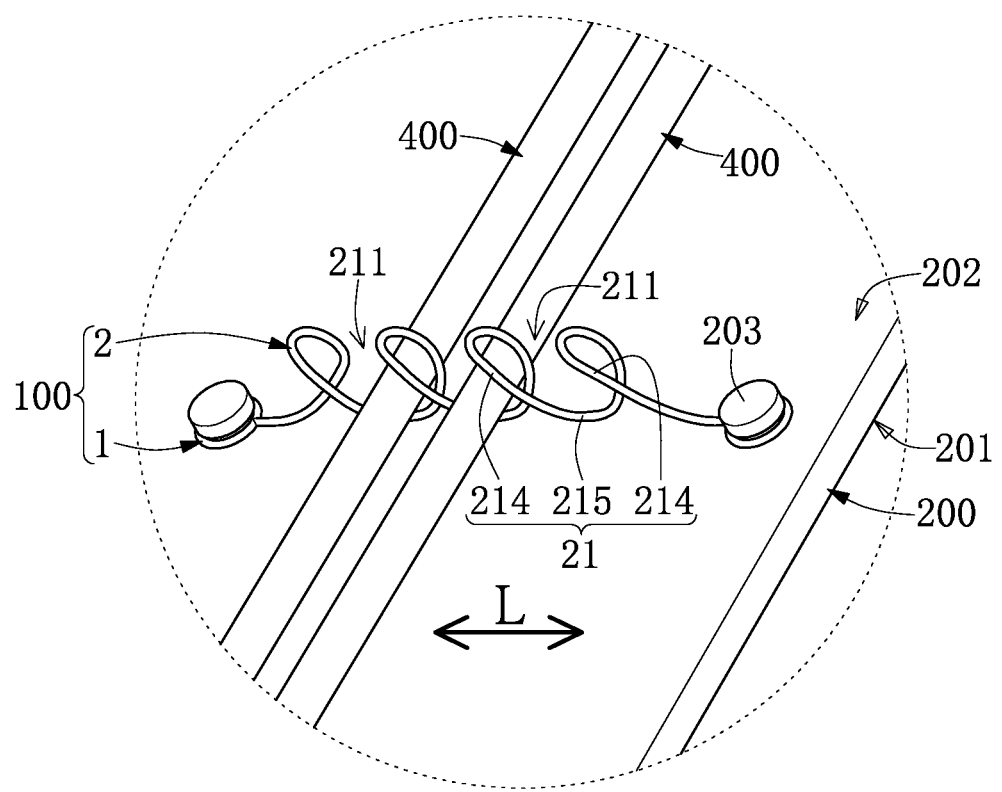
FIG. 9 is a partial perspective view of an antenna device according to a third embodiment of the present disclosure.
Figure 10:
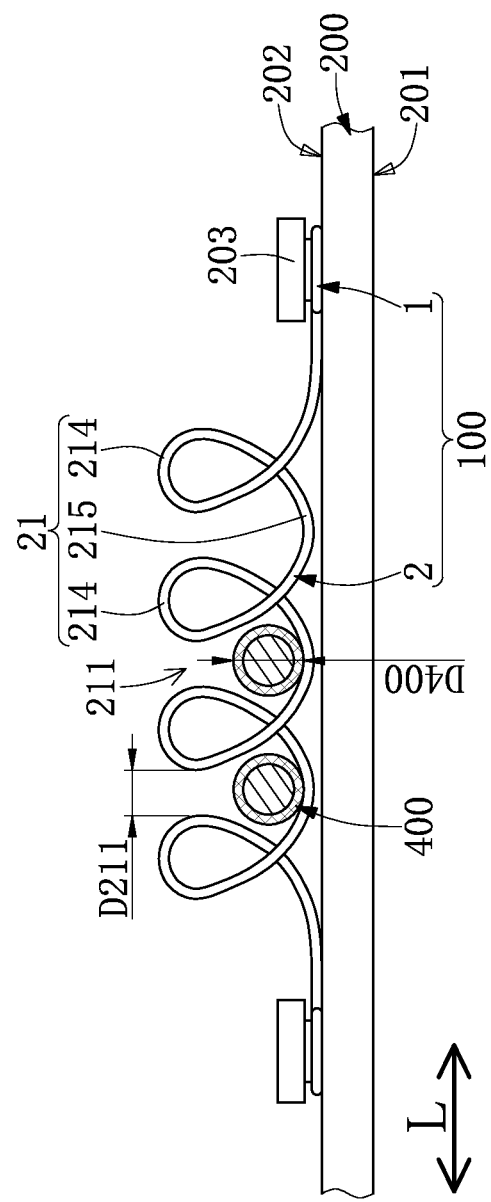
FIG. 10 is a cross-sectional view of FIG. 9.

Referring to FIG. 9 and FIG. 10, a third embodiment of the present disclosure is similar to the first embodiment of the present disclosure. For the sake of brevity, descriptions of the same components in the first and third embodiments of the present disclosure (e.g., the metal plate 200, the radiation antenna 300, and the feeding cable 400) will be omitted, and the following description only discloses different features between the first and third embodiments that reside in the structure of the cable arrangement portion 2 of the metallic cable holder 100.

In the present embodiment, the cable arrangement portion 2 is provided without any buffering segment 22, and the curvedly extending of the cable arrangement portion 2 is not in the same plane. Moreover, the cable arrangement portion 2 includes a plurality of loop-like sub-segments 214 and a plurality of carrying sub-segments 215. Any two of the loop-like sub-segments 214 adjacent to each other are connected to one of the carrying sub-segments 215 so as to jointly define one of the rack segments 21. The two fixing portions 1 are respectively connected to two of the loop-like sub-segments 214 that are arranged at two opposite outer sides of the cable arrangement portion 2.

Specifically, a minimum distance between the two loop-like sub-segments 214 in each of the rack segments 21 is defined as the insertion opening 211, and any two of the rack segments 21 adjacent to each other jointly share one of the loop-like sub-segments 214. When the feeding cable 400 is inserted into or positioned by the rack segment 21 by passing through or spreading out the insertion opening 211, the feeding cable 400 is disposed on the carrying sub-segment 215 and is movable in a space surroundingly defined by the corresponding rack segment 21.

It should be noted that in any one of the rack segments 21, the carrying sub-segment 215 is in an arced shape and has a radius of curvature that is greater than or equal to a radius of curvature of any one of the loop-like sub-segments 214. Specifically, the loop-like sub-segment 214 shared by any two of the adjacent rack segments 21 has a radius of curvature that gradually decreases along a direction away from the carrying sub-segment 215, thereby providing a buffering function similar to the buffering segment 22.

Fourth Embodiment

Figure 11:
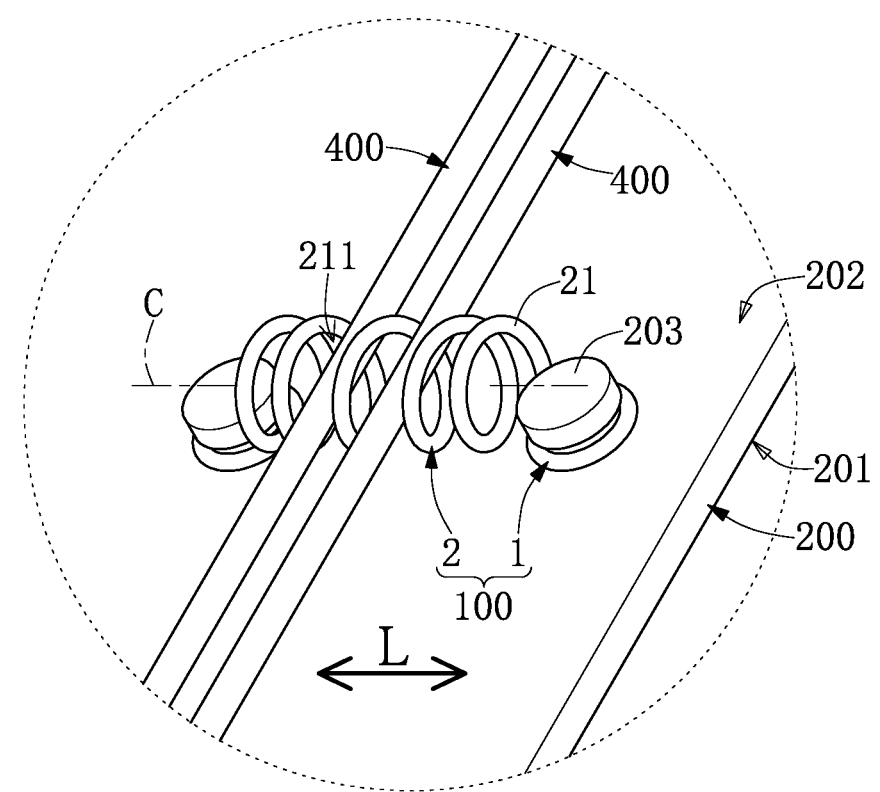
FIG. 11 is a partial perspective view of an antenna device according to a fourth embodiment of the present disclosure.
Figure 12:
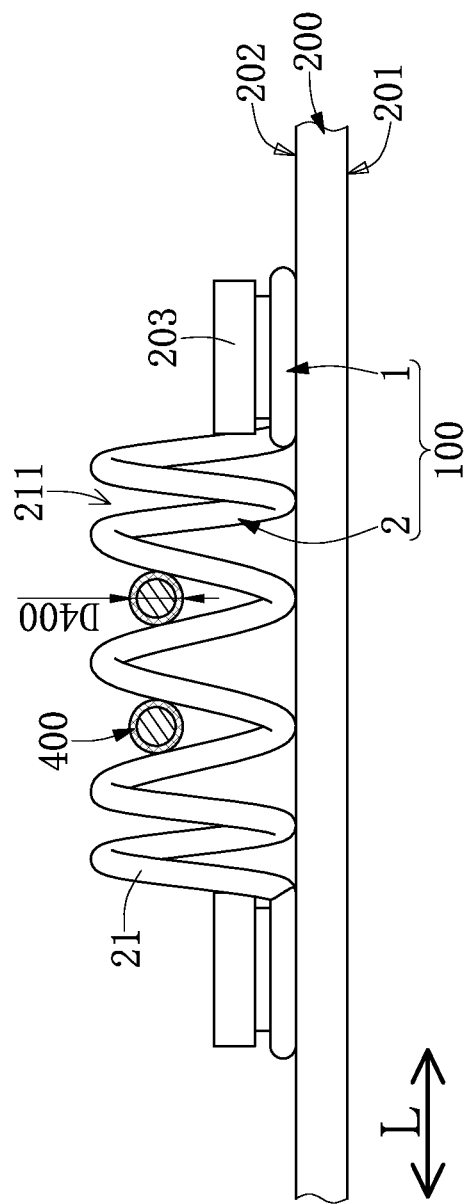
FIG. 12 is a cross-sectional view of FIG. 11.

Referring to FIG. 11 and FIG. 12, a fourth embodiment of the present disclosure is similar to the first embodiment of the present disclosure. For the sake of brevity, descriptions of the same components in the first and fourth embodiments of the present disclosure (e.g., the metal plate 200, the radiation antenna 300, and the feeding cable 400) will be omitted, and the following description only discloses different features between the first and fourth embodiments that reside in the structure of the cable arrangement portion 2 of the metallic cable holder 100.

In the present embodiment, the cable arrangement portion 2 is provided without any buffering segment 22, and the curvedly extending of the cable arrangement portion 2 is not in the same plane. Moreover, the cable arrangement portion 2 is in a spiral shape with respect to an axis line C. Any portion of the cable arrangement portion 2 within 1-1.5 pitches of the spiral shape is defined as one of the rack segments 21, and the opening diameter D211 of the insertion opening 211 of any one of the rack segments 21 is equal to one pitch of the spiral shape.

Accordingly, when the feeding cable 400 is inserted into the rack segment 21 by passing through or spreading out the insertion opening 211, the rack segment 21 is elastically deformed to firmly clutch the feeding cable 400. Specifically, the spiral cable arrangement portion 2 has a pitch diameter that is greater than the cable diameter D400 of the feeding cable 400 and that is smaller than 2.5 times of the cable diameter D400 of the feeding cable 400, thereby effectively positioning with the feeding cable 400 therein. It should be noted that the feeding cable 400 of the present embodiment is not inserted into the spiral cable arrangement portion 2 along the axis line C. In other words, any spiral structure provided for insertion of cable along an axis line of the cable is different from the metallic cable holder 100 of the present embodiment.

Fifth Embodiment

Figure 13:
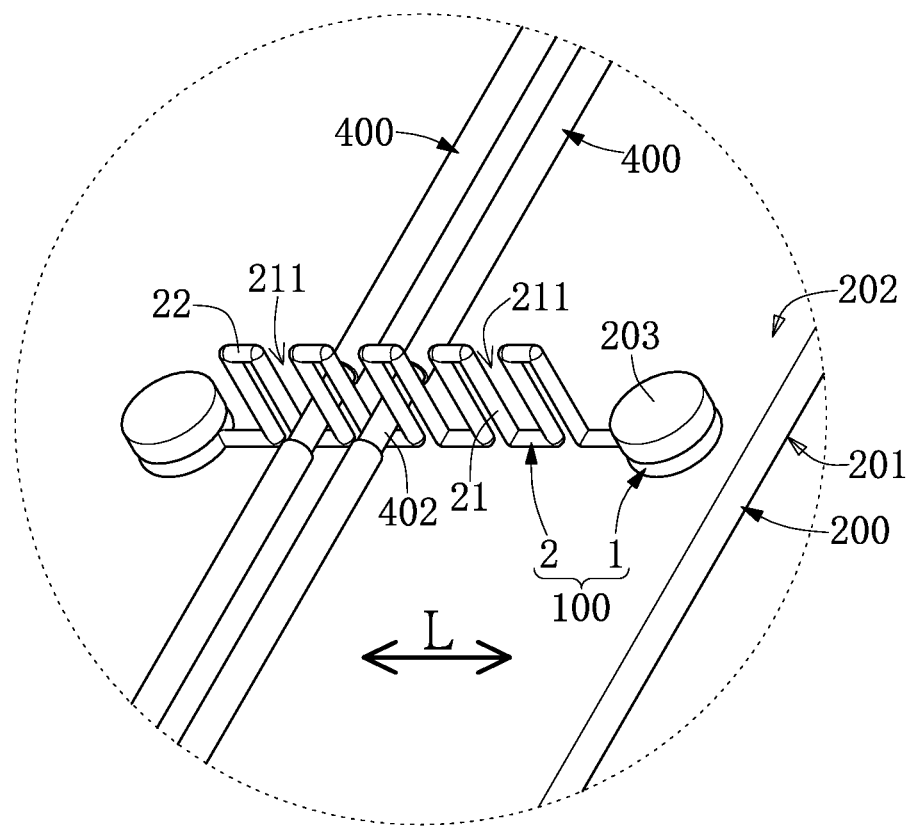
FIG. 13 is a partial perspective view of an antenna device according to a fifth embodiment of the present disclosure.

Referring to FIG. 13, a fifth embodiment of the present disclosure is similar to the first embodiment of the present disclosure. For the sake of brevity, descriptions of the same components in the first and fifth embodiments of the present disclosure (e.g., the metal plate 200, the radiation antenna 300, and the feeding cable 400) will be omitted, and the following description only discloses different features between the first and fifth embodiments that reside in the connection relationship of the metallic cable holder 100, the metal plate 200, and the feeding cable 400.

In the present embodiment, the metallic cable holder 100 can be limited to clutch the feeding cable 400 through the rack segments 21. The metallic cable holders 100 are electrically coupled to the metal plate 200, and any one of the rack segments 21 is configured to clutch a grounding portion 402 of the feeding cable 400, so that the grounding portion 402 of the feeding cable 400 is electrically coupled to the metal plate 200 through the corresponding rack segment 21, thereby achieving a common ground effect.

Sixth Embodiment

Figure 14:
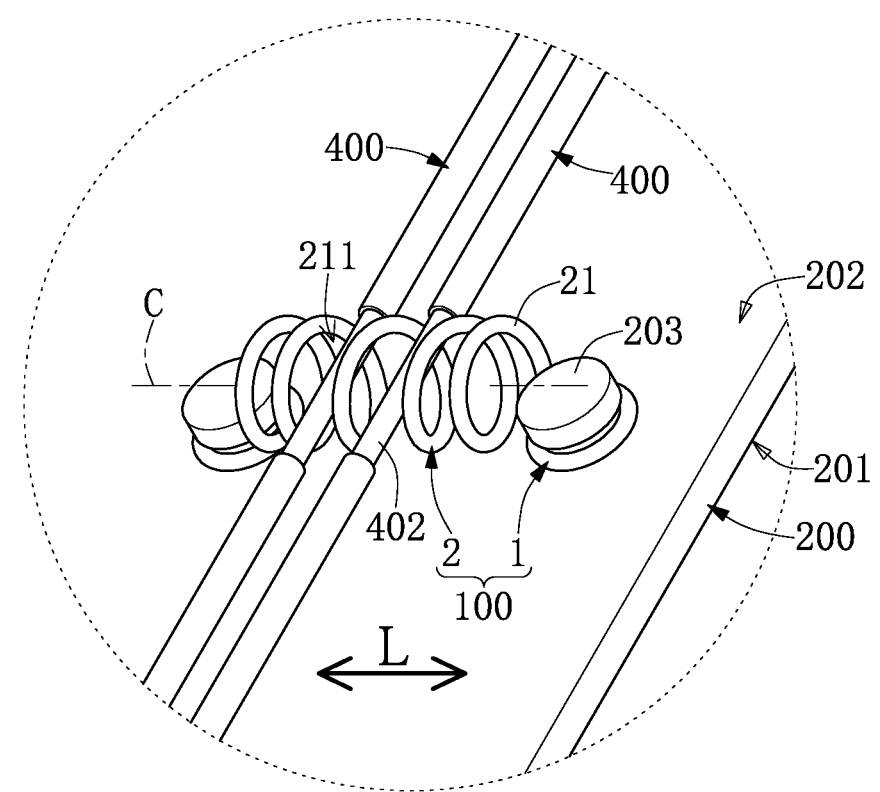
FIG. 14 is a partial perspective view of an antenna device according to a sixth embodiment of the present disclosure.

Referring to FIG. 14, a sixth embodiment of the present disclosure is similar to the fourth embodiment of the present disclosure. For the sake of brevity, descriptions of the same components in the fourth and sixth embodiments of the present disclosure (e.g., the metal plate 200, the radiation antenna 300, and the feeding cable 400) will be omitted, and the following description only discloses different features between the fourth and sixth embodiments that reside in the connection relationship of the metallic cable holder 100, the metal plate 200, and the feeding cable 400.

In the present embodiment, the metallic cable holder 100 can be limited to clutch the feeding cable 400 through the rack segments 21. The metallic cable holders 100 are electrically coupled to the metal plate 200, and any one of the rack segments 21 is configured to clutch a grounding portion 402 of the feeding cable 400, so that the grounding portion 402 of the feeding cable 400 is electrically coupled to the metal plate 200 through the corresponding rack segment 21, achieving a common ground effect.

In conclusion, a cable diameter of the feeding cable positioned by the rack segment of the present disclosure can be designed within a predetermined range (i.e., the cable diameter is not a specific value) by the metal structure of the rack segment, so that the rack segment can be used to satisfy more different design requirements of the feeding cable. Specifically, the opening diameter of the insertion opening of the rack segment is smaller than the cable diameter of the feeding cable, thereby preventing the feeding cable positioned by the corresponding rack segment from being detached from the corresponding insertion opening.

Moreover, in the present disclosure, any one of the rack segments can be used to clutch the grounding portion of the feeding cable, so that the grounding portion of the feeding cable is electrically coupled to the metal plate through the corresponding rack segment, achieving a common ground effect.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna device, comprising:
    a metal plate having a first surface and a second surface that is opposite to the first surface;
    a radiation antenna disposed on the first surface of the metal plate;
    a feeding cable arranged at a side of the metal plate away from the radiation antenna and connected to the radiation antenna by passing through the metal plate; and
    a plurality of metallic cable holders each formed by winding one metal wire, wherein each of the metallic cable holders includes:
    two fixing portions arranged along a straight direction and fixed to the second surface of the metal plate; and
    a cable arrangement portion connected between the two fixing portions and including a plurality of rack segments regularly arranged along the straight direction, wherein each of the rack segments has an insertion opening arranged away from the metal plate, and an opening diameter of the insertion opening of each of the rack segments is smaller than a cable diameter of the feeding cable,
    wherein when the feeding cable passes through the insertion opening of at least one of the rack segments, the feeding cable is fixed in position by the at least one of the rack segments and is surrounded by the at least one of the rack segments with a predetermined angle that is smaller than 360 degrees;
    wherein the metal plate has a plurality of notches and a plurality of buckling arms respectively extending from the inner walls of the notches away from the first surface, two of the buckling arms adjacent to each other are formed by curvedly extending along directions away from each other, and each of the metallic cable holders is fixed to the metal plate by having the two fixing portions thereof be respectively sleeved around two of the buckling arms adjacent to each other.

2. The antenna device according to claim 1, wherein in any one of the metallic cable holders, the cable arrangement portion curvedly extends from one of the two fixing portions toward another one of the two fixing portions along a distribution plane.

3. The antenna device according to claim 2, wherein in any one of the metallic cable holders, the distribution plane is orthogonal to the second surface of the metal plate.

4. The antenna device according to claim 2, wherein when the feeding cable passing through the insertion opening is fixed in position by the at least one of the rack segments, the feeding cable is movable in a space surroundingly defined by the at least one of the rack segments.

5. The antenna device according to claim 2, wherein in any one of the metallic cable holders, the cable arrangement portion includes a plurality of buffering segments, and any two of the rack segments adjacent to each other are connected to one of the buffering segments.

6. The antenna device according to claim 5, wherein in any one of the metallic cable holders, each of the rack segments is in a shape of the letter "U" and any part of each of the rack segments is parallel or perpendicular to the straight direction, and any two of the rack segments adjacent to each other have a distance there-between that is smaller than the opening diameter of any one of the rack segments.

7. The antenna device according to claim 5, wherein in any one of the metallic cable holders, each of the rack segments has a shape of the symbol "Ω" that includes an arc sub-segment, and wherein in each of the rack segments, the insertion opening has a center angle with respect to a center of circle of the arc sub-segment, and the center angle is smaller than 90 degrees.

8. The antenna device according to claim 1, wherein in any one of the metallic cable holders, the cable arrangement portion includes a plurality of loop-like sub-segments and a plurality of carrying sub-segments, and any two of the loop-like sub-segments adjacent to each other are connected to one of the carrying sub-segments so as to jointly define one of the rack segments, and wherein in each of the rack segments, a minimum distance between the two loop-like sub-segments is defined as the insertion opening.

9. The antenna device according to claim 8, wherein in any one of the metallic cable holders, the two fixing portions are connected to two of the loop-like sub-segments, respectively, and any two of the rack segments adjacent to each other jointly share one of the loop-like sub-segments.

10. The antenna device according to claim 8, wherein in any one of the rack segments, the carrying sub-segment is in an arced shape and has a radius of curvature that is greater than or equal to a radius of curvature of any one of the loop-like sub-segments.

11. The antenna device according to claim 1, wherein in any one of the metallic cable holders, the cable arrangement portion is in a spiral shape with respect to an axis line, any portion of the cable arrangement portion having 1-1.5 pitches is defined as one of the rack segments, the opening diameter of the insertion opening of any one of the rack segments is equal to 1 pitch, and any one of the rack segments is configured to clutch the feeding cable.

12. The antenna device according to claim 11, wherein in any one of the metallic cable holders, the cable arrangement portion has a pitch diameter that is greater than the cable diameter of the feeding cable and that, is smaller than 2.5 times of the cable diameter of the feeding cable.

13. The antenna device according to claim 11, wherein in any one of the metallic cable holders, the feeding cable is not inserted into the cable arrangement portion along the axis line.

14. The antenna device according to claim 1, wherein the metallic cable holders are electrically coupled to the metal plate and any one of the rack segments is configured to clutch a grounding portion of the feeding cable, so that the grounding portion of the feeding cable is electrically coupled to the metal plate through the corresponding rack segment.

15. The antenna device according to claim 1, wherein in each of the rack segments, the opening diameter of the insertion opening is greater than 35% of the cable diameter of the feeding cable.

16. The antenna device according to claim 1, wherein the feeding cable has a plurality of bending segments, and a part of each of the bending segments is fixed in position by one of the metallic cable holders.

17. A feeding cable module of an antenna device, comprising:
    a feeding cable; and
    a metallic cable holder integrally formed as a one-piece structure and including:
    two fixing portions arranged along a straight direction; and
    a cable arrangement portion connected between the two fixing portions and including a plurality of rack segments regularly arranged along the straight direction, wherein each of the rack segments has an insertion opening, and an opening diameter of the insertion opening of each of the rack segments is smaller than a cable diameter of the feeding cable,
    wherein when the feeding cable passes through the insertion opening of at least one of the rack segments, the feeding cable is fixed in position by the corresponding rack segment and is surrounded by the corresponding rack segment with a predetermined angle that is smaller than 360 degrees;
    wherein the cable arrangement portion is in a spiral shape with respect to an axis line, any portion of the cable arrangement portion having 1-1.5 pitches is defined as one of the rack segments, the opening diameter of the insertion opening of any one of the rack segments is equal to 1 pitch, and any one of the rack segments is configured to clutch the feeding cable.

18. A metallic cable holder of an antenna device, comprising:
    two fixing portions arranged along a straight direction; and
    a cable arrangement portion connected between the two fixing portions and including a plurality of rack segments regularly arranged along the straight direction, wherein each of the rack segments has an insertion opening, and the insertion opening of each of the rack segments is configured to hold a feeding cable having a cable diameter that is greater than an opening diameter of the insertion opening;
    wherein the cable arrangement portion includes a plurality of loop-like sub-segments and a plurality of carrying sub-segments, and any two of the loop-like sub-segments adjacent to each other are connected to one of the carrying sub-segments so as to jointly define one of the rack segments, and wherein in each of the rack segments, a minimum distance between the two loop-like sub-segments is defined as the insertion opening.

19. A metallic cable holder of an antenna device, comprising:
    two fixing portions arranged along a straight direction; and
    a cable arrangement portion connected between the two fixing portions and including a plurality of rack segments regularly arranged along the straight direction, wherein each of the rack segments has an insertion opening, and the insertion opening of each of the rack segments is configured to hold a feeding cable having a cable diameter that is greater than an opening diameter of the insertion opening;
    wherein each of the rack segments has a shape of the symbol "Ω" that includes an arc sub-segment, and wherein in each of the rack segments, the insertion opening has a center angle with respect to a center of circle of the arc sub-segment, and the center angle is smaller than 90 degrees.

* * * * *